United States Patent
Zhong

(10) Patent No.: US 9,128,340 B2
(45) Date of Patent: Sep. 8, 2015

(54) DUAL-TFT-SUBSTRATE BLUE-PHASE LIQUID CRYSTAL DISPLAY PANEL

(71) Applicant: Shenzhen China Star Optoelectronics Technology Co., LTD., Shenzhen, Guangdong Province (CN)

(72) Inventor: Xinhui Zhong, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 291 days.

(21) Appl. No.: 13/806,133

(22) PCT Filed: Oct. 10, 2012

(86) PCT No.: PCT/CN2012/082661
§ 371 (c)(1),
(2) Date: Dec. 20, 2012

(87) PCT Pub. No.: WO2014/040329
PCT Pub. Date: Mar. 20, 2014

(65) Prior Publication Data
US 2014/0078439 A1   Mar. 20, 2014

(30) Foreign Application Priority Data
Sep. 14, 2012 (CN) .......................... 2012 1 0341603

(51) Int. Cl.
*G02F 1/1343* (2006.01)
*G02F 1/1368* (2006.01)
*G02F 1/1347* (2006.01)
*G02F 1/137* (2006.01)

(52) U.S. Cl.
CPC .......... *G02F 1/1368* (2013.01); *G02F 1/13471* (2013.01); *G02F 1/134363* (2013.01); *G02F 2001/13793* (2013.01)

(58) Field of Classification Search
USPC .......................................... 349/141
See application file for complete search history.

(56) References Cited

U.S. PATENT DOCUMENTS

| 6,469,758 B2 | 10/2002 | Yu |
| 6,700,558 B1 * | 3/2004 | Itoh ................................. 345/87 |
| 2004/0109121 A1 * | 6/2004 | Cho et al. ...................... 349/141 |

(Continued)

FOREIGN PATENT DOCUMENTS

| CN | 101916010 A | 12/2010 |
| CN | 101976005 A | 2/2011 |

(Continued)

*Primary Examiner* — Lucy Chien
(74) *Attorney, Agent, or Firm* — Cheng-Ju Chiang

(57) ABSTRACT

The present invention relates to a dual-TFT-substrate blue-phase liquid crystal display panel. The dual-TFT-substrate blue-phase liquid crystal display panel includes a top polarizer, a top TFT substrate, a blue phase liquid crystal layer, a bottom TFT substrate, and a bottom polarizer, which are sequentially stacked from top to bottom. The top and bottom TFT substrates have identical IPS electrode structures and the IPS electrode structures respectively drives the top and bottom TFT substrates. The dual-TFT-substrate blue-phase liquid crystal display panel further includes a color filter, which is arranged at one side of the top TFT substrate or one side of the bottom TFT substrate. The dual-TFT-substrate blue-phase liquid crystal display panel of the present invention uses an arrangement of dual-side IPS structure to reduce the operation voltage of a blue phase liquid crystal display device.

11 Claims, 3 Drawing Sheets

(56) References Cited

U.S. PATENT DOCUMENTS

| | | | |
|---|---|---|---|
| 2005/0083468 A1* | 4/2005 | Chen et al. | 349/141 |
| 2008/0129901 A1* | 6/2008 | You et al. | 349/141 |
| 2010/0055583 A1 | 3/2010 | Kim | |
| 2011/0242468 A1* | 10/2011 | Choi et al. | 349/129 |

FOREIGN PATENT DOCUMENTS

| | | |
|---|---|---|
| CN | 102103296 A | 6/2011 |
| CN | 202285169 U | 6/2012 |

* cited by examiner

DUAL-TFT-SUBSTRATE BLUE-PHASE LIQUID CRYSTAL DISPLAY PANEL

BACKGROUND OF THE INVENTION

1. Field of the Invention

The present invention relates to the technical field of liquid crystal displaying, and in particular to a dual-TFT-substrate blue-phase liquid crystal display panel.

2. The Related Arts

Liquid crystal displays (LCDs) have numerous advantages, such as thin device body, less power consumption, and being free of radiation, and is thus widely used. Most of the flat panel display devices available in the market are backlighting liquid crystal displays, which comprise a liquid crystal panel and a backlight module. The operation principle of the liquid crystal panel is that liquid crystal molecules are arranged between two parallel glass substrates and electricity is selectively applied to the glass substrates to cause change of the orientation of the liquid crystal molecules in order to refract out the light from a backlight module for formation of an image.

A liquid crystal display panel is generally composed of a color filter (CF) substrate, a thin-film transistor (TFT) substrate, liquid crystal (LC) interposed between the CF substrate and the TFT substrate, and a sealant. A general manufacturing process comprises a front stage of array process (including thin film, yellow light, etching, and film stripping), an intermediate stage of cell process (including bonding TFT substrate and the CF substrate), and a rear stage of assembling process (including mounting drive ICs and printed circuit board). The front stage of array process generally makes the TFT substrate for controlling the movement of liquid crystal molecules. The intermediate stage of cell process generally introduces liquid crystal between the TFT substrate and the CF substrate. The rear stage of assembling process generally mounts the drive ICs and combining the printed circuit board to effect driving the liquid crystal molecules to rotate for displaying images.

Active TFT-LCD displays have recently gained fast progress and wide application. The TFT-LCD display panels that are available in the main stream market are generally classified in three categories, including TN (Twisted Nematic)/STN (Super Twisted Nematic), IPS (In-Plane Switching), and VA (Vertical Alignment). Although the ways how the three categories of liquid crystal display panel control liquid crystal displaying are different, they are generally of similar basic structures. Referring to FIG. 1, which is a schematic view showing the structure of a conventional TFT-LCD display panel, the conventional TFT-LCD display panel generally comprises, laminated from top to bottom, a top polarizer 10, a color filter substrate 11, a liquid crystal layer 12, a TFT substrate 13, and a bottom polarizer 14, which are With the increasing need for displaying, new techniques are also available, such as 3D display device and high response speed display devices. To achieve fast response, blue phase liquid crystal displaying techniques have recently been extensively studied and developed. Blue phase is a liquid crystal phase existing between an isotropic phase and a cholesteric phase. The blue phase liquid crystal displaying technique has advantages including wide view angle, fast response time, being free of rubbing for alignment, reduced influence of thickness of liquid crystal cell. However, in the driving manner of IPS structure used in the blue phase liquid crystal displaying, since the penetration depth of a lateral electric field generated by parallel electrodes is limited, a relatively high driving voltage is necessary, or the height of electrodes must be increased to increase the intensity of the lateral electric field. Similar solutions include using wedge-shaped electrodes and wavy electrodes. As shown in FIGS. 2A and 2B, schematic views are given to illustrate the structure of electrode for the conventional TFT-LCD display panel. As shown in FIG. 2A, electrodes provided on a TFT substrate 21 are wavy-shaped electrodes 22. As shown in FIG. 2B, electrodes provided on a TFT substrate 23 are wedge-shaped electrodes 24. However, these solutions increase the level of difficulty of manufacturing processes and lower down yield rate. Thus, it is apparent that blue phase liquid crystal displaying techniques using IPS driving solution can be further improved.

SUMMARY OF THE INVENTION

Thus, an object of the present invention is to provide a dual-TFT-substrate blue-phase liquid crystal display panel, which reduces operation voltage of blue-phase liquid crystal display devices.

To achieve the objective, the present invention provides a dual-TFT-substrate blue-phase liquid crystal display panel, which comprises a top polarizer, a top TFT substrate, a blue phase liquid crystal layer, a bottom TFT substrate, and a bottom polarizer, which are sequentially stacked from top to bottom. The top and bottom TFT substrates comprise identical IPS electrode structures. The IPS electrode structures respectively drive the top and bottom TFT substrates.

The dual-TFT-substrate blue-phase liquid crystal display panel further comprises a color filter. The color filter is arranged at one side of the top TFT substrate.

The dual-TFT-substrate blue-phase liquid crystal display panel further comprises a color filter. The color filter is arranged at one side of the bottom TFT substrate.

The top and bottom TFT substrate comprise identical or different TFT components.

The dual-TFT-substrate blue-phase liquid crystal display panel further comprises flashing backlight. The flashing backlight comprises alternate flashing of a combination of different colors to allow the dual-TFT-substrate blue-phase liquid crystal display panel to achieve an effect of color displaying.

The dual-TFT-substrate blue-phase liquid crystal display panel further comprises an LCD panel control module, a backlight control module, and a synchronization module. The LCD panel control module is connected to and controls the driving of the dual-TFT-substrate blue-phase liquid crystal display panel. The backlight control module is connected to and controls the alternate flashing of the combination of different colors of the flashing backlight. The synchronization module is connected to the LCD panel control module and the backlight control module to coordinate operations thereof.

The IPS electrode structures comprise ITO electrodes.

The ITO electrodes are of a flat structure.

The ITO electrodes are of a wedge-shaped structure.

The ITO electrodes are of a wavy-shaped structure.

The present invention also provides a dual-TFT-substrate blue-phase liquid crystal display panel, which comprises a top polarizer, a top TFT substrate, a blue phase liquid crystal layer, a bottom TFT substrate, and a bottom polarizer, which are sequentially stacked from top to bottom, the top and bottom TFT substrates comprising identical IPS electrode structures, the IPS electrode structures respectively driving the top and bottom TFT substrates; and wherein the top and bottom TFT substrate comprise identical or different TFT components;

further comprising flashing backlight, the flashing backlight comprising alternate flashing of a combination of different colors to allow the dual-TFT-substrate blue-phase liquid crystal display panel to achieve an effect of color displaying;

further comprising an LCD panel control module, a backlight control module, and a synchronization module, the LCD panel control module being connected to and controlling the driving of the dual-TFT-substrate blue-phase liquid crystal display panel, the backlight control module being connected to and controlling the alternate flashing of the combination of different colors of the flashing backlight, the synchronization module being connected to the LCD panel control module and the backlight control module to coordinate operations thereof;

wherein the IPS electrode structures comprise ITO electrodes; and wherein the ITO electrodes are of a flat structure.

The present invention provides a dual-TFT-substrate blue-phase liquid crystal display panel, which uses an arrangement of dual-side IPS structure to reduce the operation voltage of a blue phase liquid crystal display device.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

Figure 1:
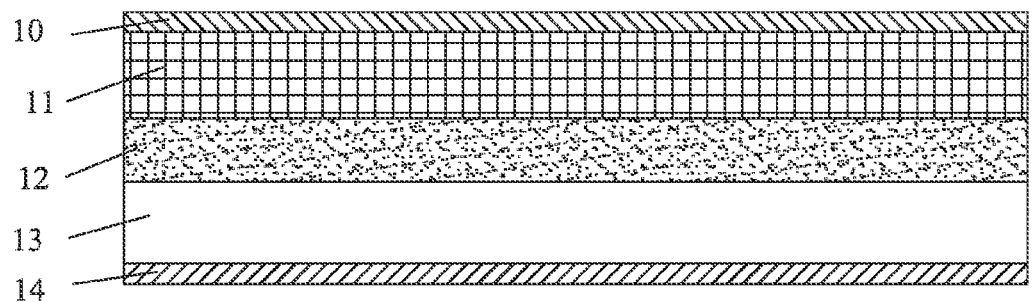
FIG. 1 is a schematic view showing the structure of a conventional TFT-LCD display panel.
Figure 2A:
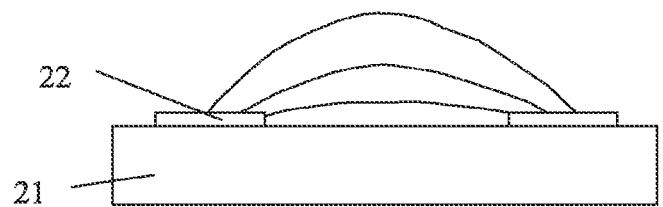
FIGS. 2A and 2B are schematic views showing structures of electrode of the conventional TFT-LCD display panels.
Figure 2B:
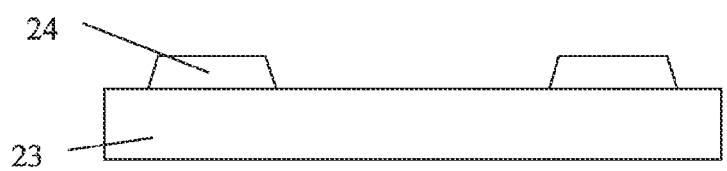
Figure 3:
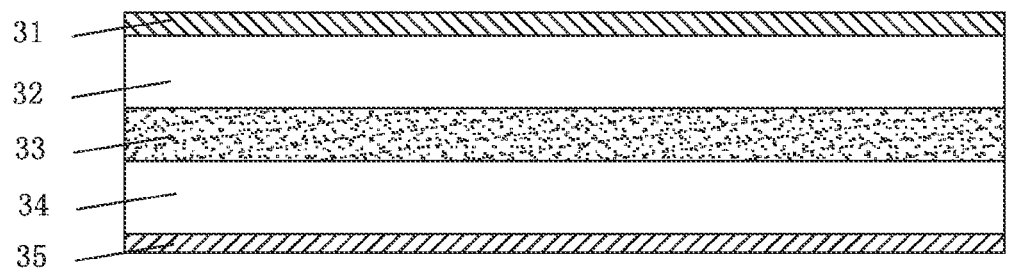
FIG. 3 is a schematic view showing the structure of a dual-TFT-substrate blue-phase liquid crystal display panel according to a preferred embodiment of the present invention.

Referring to FIG. 3, a schematic view is given to show the structure of a dual-TFT-substrate blue-phase liquid crystal display panel according to a preferred embodiment of the present invention. The dual-TFT-substrate blue-phase liquid crystal display panel of the present invention comprises TFT matrix substrates arranged at both sides, including a top TFT substrate 32, a bottom TFT substrate 34, and a blue phase liquid crystal layer 33 interposed therebetween, and a top polarizer 31 and a bottom polarizer 35, all layers being laminated sequentially from top to bottom. The top TFT substrate 32 and the bottom TFT substrate 34 both comprise identical IPS electrode structures. The IPS electrode structures respectively drive the top TFT substrate 32 and the bottom TFT substrate 34. Similar to a conventional TFT substrate, the top TFT substrate 32 and the bottom TFT substrate 34 may comprise various TFT components formed thereon, including data signal lines, TFT switching lines, TFT switching devices, storage capacitor electrodes, ITO (Indium Tin Oxides) electrodes, black matrixes for shielding leaking light, and color filters (CF). The TFT components of the two TFT substrates of the dual-TFT-substrate blue-phase liquid crystal display panel, such as the TFT switching devices and the ITO electrodes, and the two TFT substrates of top TFT substrate 32 and bottom TFT substrate 34 can be identical or different.

Figure 4:
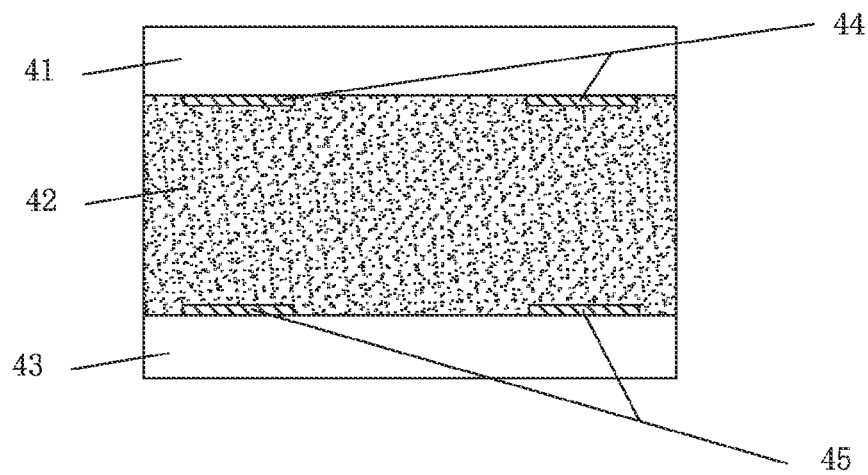
FIG. 4 is a schematic view showing the structure of electrode for the dual-TFT-substrate blue-phase liquid crystal display pane according to the preferred embodiment of the present invention.

Referring to FIG. 4, a schematic view is given to show the structure of electrode of the dual-TFT-substrate blue-phase liquid crystal display panel according to the preferred embodiment of the present invention. The liquid crystal medium used in the present invention is the blue phase liquid crystal layer 42. The top TFT substrate 41 and the bottom TFT substrate 43 comprise identical IPS electrode structures 44, 45. The IPS electrode structures 44, 45 can be ITO electrodes. The ITO electrodes can be of a flat structure, a wedge-shaped structure, or a wavy-shaped structure. The two TFT substrates of top TFT substrate 41 and bottom TFT substrate 43 are driven independently. The ITO electrode of each TFT substrate may generate a lateral electric field applied to the blue phase liquid crystal layer 42 of blue phase liquid crystal medium to cause a phase difference. Compared to a single-side IPS-driving blue phase liquid crystal display device, an arrangement of two-side IPS structure reduces the operation voltage of the blue phase liquid crystal display device.

Figure 5A:
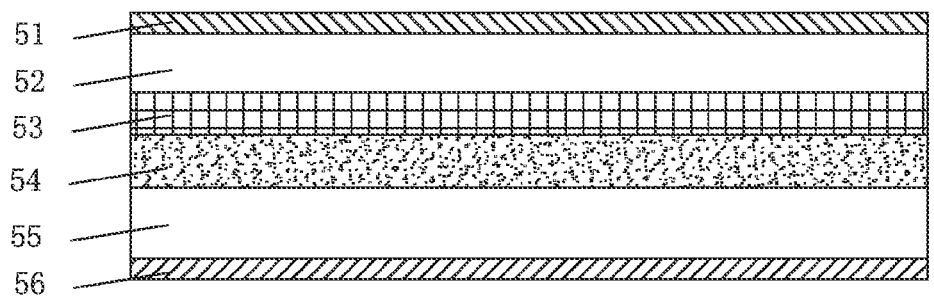
FIGS. 5A and 5B are schematic views showing structures of dual-TFT-substrate blue-phase liquid crystal display panels including a color filter according to the present invention.
Figure 5B:
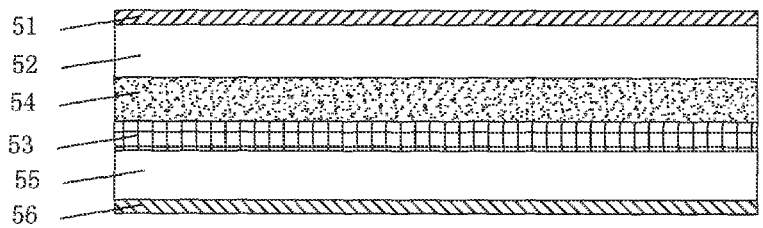

Referring to FIGS. 5A and 5B, schematic views are given to illustrate the structures of the dual-TFT-substrate blue-phase liquid crystal display panel of the present invention including a color filter. Compared to the dual-TFT-substrate blue-phase liquid crystal display panel shown in FIG. 3, when the TFT substrate includes a color filter, the color filter can be arranged at either side of the top and bottom TFT substrates in order to achieve an effect of color displaying. The dual-TFT-substrate blue-phase liquid crystal display panels of FIGS. 5A and 5B comprise a top polarizer 51, a top TFT substrate 52, a color filter 53, a blue phase liquid crystal layer 54, a bottom TFT substrate 55, and a bottom polarizer 56. In FIG. 5A, the color filter 53 is arranged at one side of the top TFT substrate 52 and between the top TFT substrate 52 and the blue phase liquid crystal layer 54. In FIG. 5B, the color filter 53 is arranged at one side of the bottom TFT substrate 55 and between the bottom TFT substrate 55 and the blue phase liquid crystal layer 54.

Figure 6:
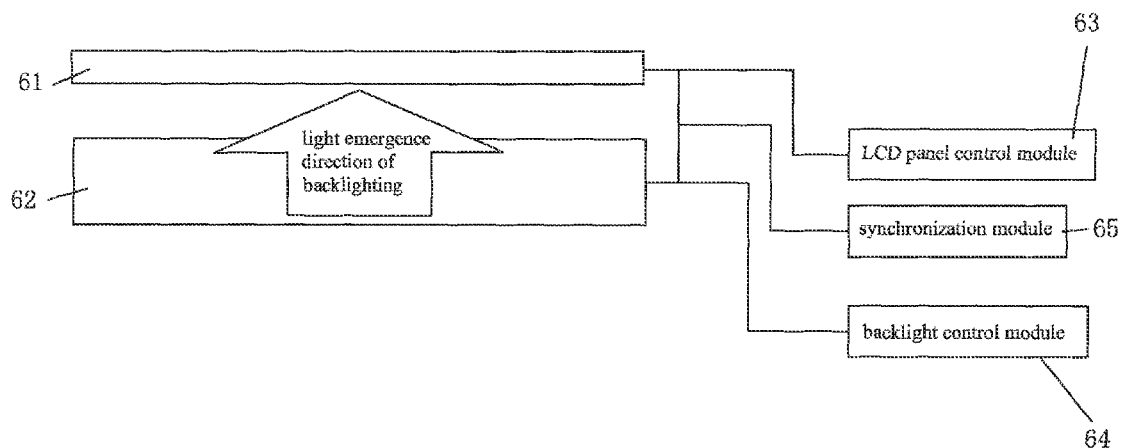
FIG. 6 is a schematic view illustrating the operation principle of the dual-TFT-substrate blue-phase liquid crystal display pane according to the present invention in combination with flashing backlighting.

If the TFT substrates do not include a color filter, then the dual-TFT-substrate blue-phase liquid crystal display panel according to the present invention can be used for monochromic displaying or can alternatively be used in combination with flashing backlighting to provide an effect of color displaying. Referring to FIG. 6, a schematic view is given to illustrate the operation principle of the dual-TFT-substrate blue-phase liquid crystal display panel in combination with flashing backlight. In FIG. 6, the dual-TFT-substrate blue-phase liquid crystal display panel 61 includes no color filter and the flashing backlight 62 follows a light emergence direction indicated by the arrow to irradiate the dual-TFT-substrate blue-phase liquid crystal display panel 61. By adopting alternate flashing of R, G, B or a combination of other different colors, the dual-TFT-substrate blue-phase liquid crystal display panel 61 may achieve an effect of color displaying. An LCD panel control module 63, a backlight control module 64, and a synchronization module 65 are also included. The LCD panel control module 63 is connected to and controls the driving of the dual-TFT-substrate blue-phase liquid crystal display panel 61. The backlight control module 64 is connected to and controls the alternate flashing of a combination of different colors of the flashing backlight 62. The synchronization module 65 is connected to the LCD panel control module 63 and the backlight control module 64 to coordinate the operations thereof.

In summary, the present invention provides a dual-TFT-substrate blue-phase liquid crystal display panel, which uses an arrangement of dual-side IPS structure to reduce the operation voltage of a blue phase liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A dual-TFT (thin-film transistor)-substrate blue-phase liquid crystal display panel, comprising a top polarizer, a top TFT substrate, a blue phase liquid crystal layer, a bottom TFT substrate, and a bottom polarizer, which are sequentially stacked from top to bottom, the top and bottom TFT substrates comprising identical IPS (In-Plane Switching) electrode structures that correspond in position to each other, the IPS electrode structures respectively driving the top and bottom TFT substrates.

2. The dual-TFT-substrate blue-phase liquid crystal display panel as claimed in claim 1 further comprising a color filter, the color filter being arranged at one side of the top TFT substrate.

3. The dual-TFT-substrate blue-phase liquid crystal display panel as claimed in claim 1 further comprising a color filter, the color filter being arranged at one side of the bottom TFT substrate.

4. The dual-TFT-substrate blue-phase liquid crystal display panel as claimed in claim 1, wherein the top and bottom TFT substrate comprise identical or different TFT component.

5. The dual-TFT-substrate blue-phase liquid crystal display panel as claimed in claim 1 further comprising flashing backlight, the flashing backlight comprising alternate flashing of a combination of different colors to allow the dual-TFT-substrate blue-phase liquid crystal display panel to achieve an effect of color displaying.

6. The dual-TFT-substrate blue-phase liquid crystal display panel as claimed in claim 5 further comprising an LCD (liquid crystal display) panel control module, a backlight control module, and a synchronization module, the LCD panel control module being connected to and controlling the driving of the dual-TFT-substrate blue-phase liquid crystal display panel, the backlight control module being connected to and controlling the alternate flashing of the combination of different colors of the flashing backlight, the synchronization module being connected to the LCD panel control module and the backlight control module to coordinate operations thereof.

7. The dual-TFT-substrate blue-phase liquid crystal display panel as claimed in claim 1, wherein the IPS electrode structures comprise ITO (Indium Tin Oxides) electrodes.

8. The dual-TFT-substrate blue-phase liquid crystal display panel as claimed in claim 7, wherein the ITO electrodes are of a flat structure.

9. The dual-TFT-substrate blue-phase liquid crystal display panel as claimed in claim 7, wherein the ITO electrodes are of a wedge-shaped structure.

10. The dual-TFT-substrate blue-phase liquid crystal display panel as claimed in claim 7, wherein the ITO electrodes are of a wavy-shaped structure.

11. A dual-TFT (thin-film transistor)-substrate blue-phase liquid crystal display panel, comprising a top polarizer, a top TFT substrate, a blue phase liquid crystal layer, a bottom TFT substrate, and a bottom polarizer, which are sequentially stacked from top to bottom, the top and bottom TFT substrates comprising identical IPS (In-Plane Switching) electrode structures that correspond in position to each other, the IPS electrode structures respectively driving the top and bottom TFT substrates; and wherein the top and bottom TFT substrate comprise identical or different TFT components;

further comprising flashing backlight, the flashing backlight comprising alternate flashing of a combination of different colors to allow the dual-TFT-substrate blue-phase liquid crystal display panel to achieve an effect of color displaying;

further comprising an LCD (liquid crystal display) panel control module, a backlight control module, and a synchronization module, the LCD panel control module being connected to and controlling the driving of the dual-TFT-substrate blue-phase liquid crystal display panel, the backlight control module being connected to and controlling the alternate flashing of the combination of different colors of the flashing backlight, the synchronization module being connected to the LCD panel control module and the backlight control module to coordinate operations thereof;

wherein the IPS electrode structures comprise ITO (Indium Tin Oxides) electrodes; and wherein the ITO electrodes are of a flat structure.

\* \* \* \* \*